June 11, 1946.  M. S. ARIENS  2,402,008
TRACTOR AND EARTH WORKING COMBINATION UNIT
Filed Sept. 23, 1944    3 Sheets-Sheet 1

INVENTOR
MANDO S. ARIENS
BY
ATTORNEYS

June 11, 1946.    M. S. ARIENS    2,402,008
TRACTOR AND EARTH WORKING COMBINATION UNIT
Filed Sept. 23, 1944    3 Sheets-Sheet 2
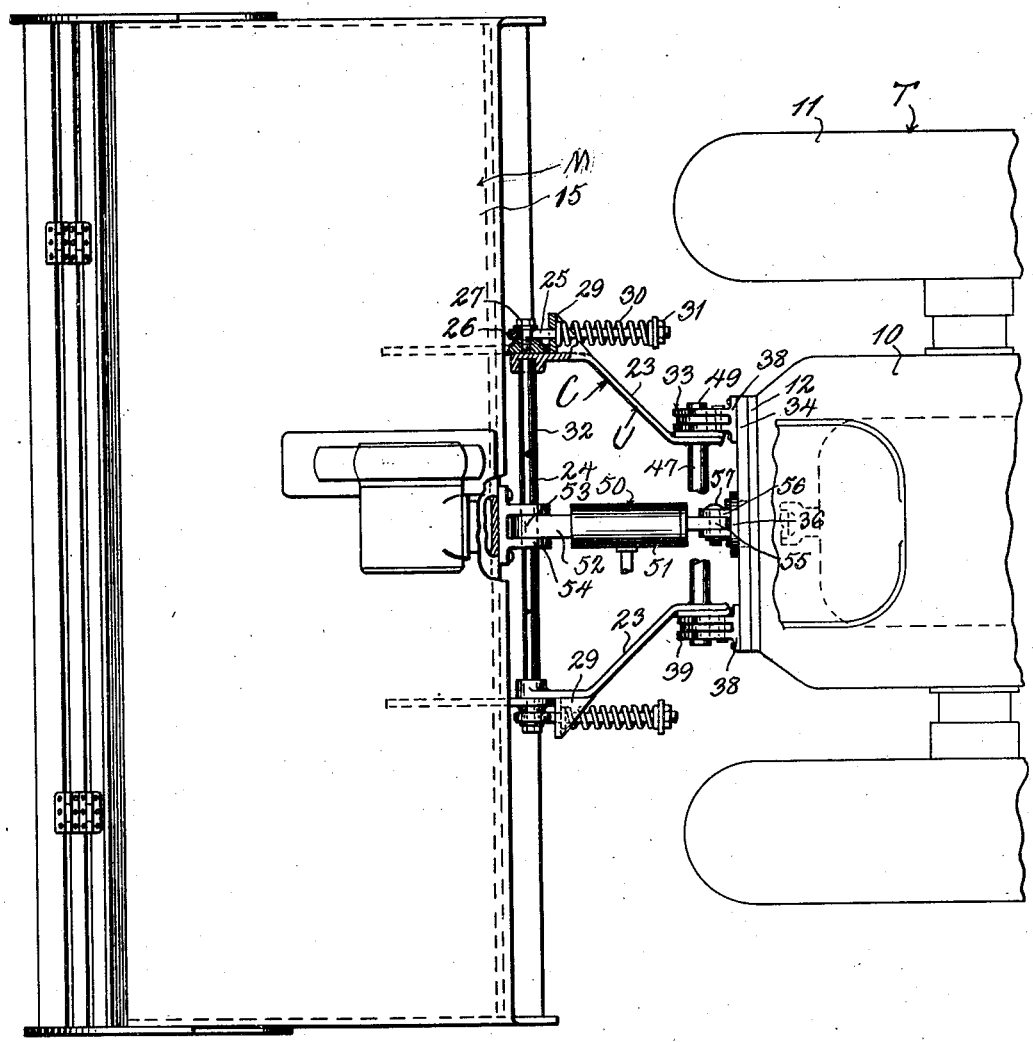
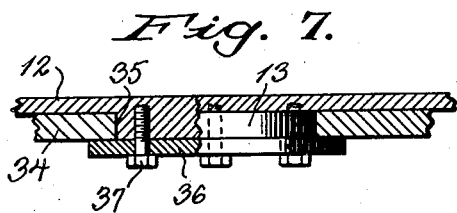
INVENTOR
MANDO S. ARIENS
BY
ATTORNEYS June 11, 1946.  M. S. ARIENS  2,402,008
TRACTOR AND EARTH WORKING COMBINATION UNIT
Filed Sept. 23, 1944  3 Sheets-Sheet 3

INVENTOR
MANDO S. ARIENS
BY
ATTORNEYS

Patented June 11, 1946

2,402,008

UNITED STATES PATENT OFFICE 2,402,008

TRACTOR AND EARTH WORKING COMBINATION UNIT

Mando S. Ariens, Brillion, Wis.

Application September 23, 1944, Serial No. 555,512

5 Claims. (Cl. 97—199)

This invention appertains to agricultural, road and like machinery and more particularly to a novel means for connecting a rotary tiller or a rotary aggregate mixer for highways directly with a pulling vehicle such as a tractor.

One of the primary objects of my present invention is to provide novel means for resiliently and pivotally supporting a rotary earth working machine directly with a tractor, whereby said machine will be free to swing up and down on the tractor according to ground conditions and whereby the tines of said machine will be protected from solid objects by said resilient connection.

Another salient object of my invention is the provision of novel means for directly coupling a rotary earth working machine with a tractor, whereby said machine can readily tilt or oscillate relative to the transverse axis of the tractor, as well as swing up and down on the tractor, so that said machine will readily conform to the character of the ground over which the same is traveling.

A further important object of my invention is to provide a novel coupling device for connecting a rotary earth working machine with a tractor having incorporated therewith in a novel manner a hydraulic lift mechanism, whereby the machine can be readily raised and held in an elevated position out of operative engagement with the ground.

A still further object of my invention is to provide means arranged in the coupling whereby the tractor and rotary earth working machine can be automatically connected upon the moving of the tractor and the machine together in coupling relation.

With these and other objects in view the invention consists in the novel construction, arrangement and formation of parts as will be hereinafter more specifically be described, claimed and illustrated in the accompanying drawings, in which drawings;

Figure 2 is a fragmentary top plan view of my novel unit with parts thereof broken away and in section.

Figure 7 is an enlarged detailed sectional view taken on the line 7—7 of Figure 4 looking in the direction of the arrows illustrating in detail the means for connecting the earth working machine with the tractor for tilting movement.

Figure 1:
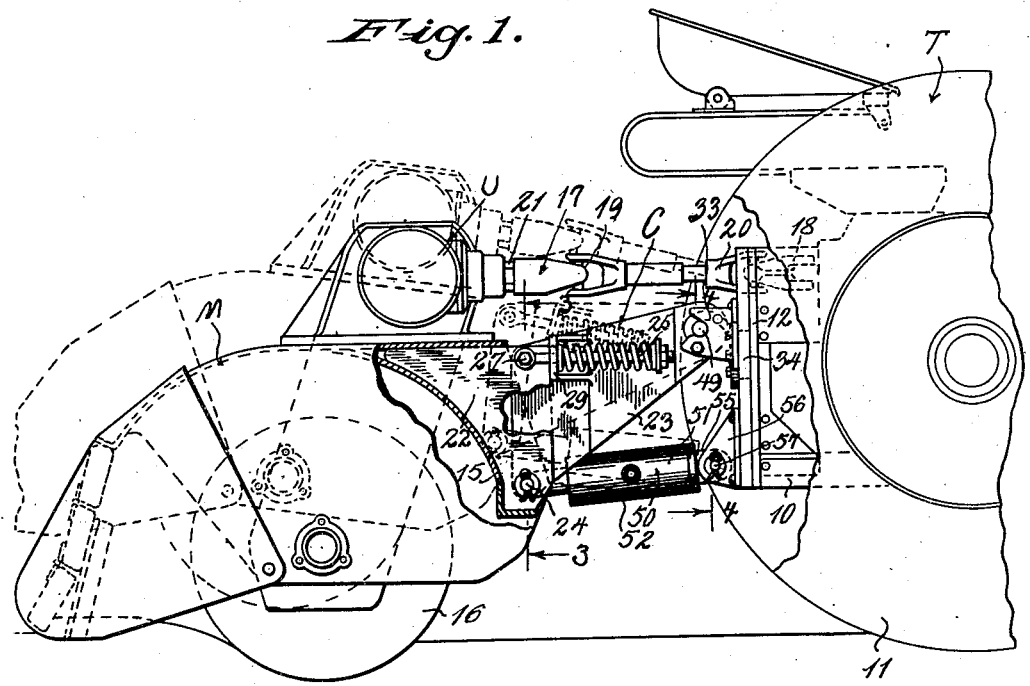
Figure 1 is a fragmentary side elevational view of my novel tractor and rotary earth working unit, parts of the view being shown broken away and in section.

Referring to the drawings in detail, wherein similar reference characters designate corresponding parts throughout the several views the letter U generally indicates my novel tractor and rotary earth working unit and the same includes the tractor T having connected therewith, by novel coupling mechanism C the rotary earth working machine M.

The tractor T can be of any known type now found in the open market and will not be described in detail, but the same includes a rigid frame 10 on which is mounted the engine and front steering ground wheels (not shown) and the rear drive ground wheels 11. In accordance with my invention the rear end of the tractor frame 10 has rigidly fastened thereto a cross plate 12, which can form a direct part of the tractor frame, if so desired. This plate has formed thereon or secured thereto a rearwardly projecting circular bearing disk 13, which forms an important part of my invention.

The rotary earth working machine M can be of the same type as or similar to my rotary soil pulverizer shown in Patent No. 2,025,494, issued to me December 24, 1935. This machine M can be utilized as a tiller or as a mixer for combining road aggregates with a suitable binder. This machine will not be described in detail, but the same includes a frame 15 supported by rubber tired ground wheels 16. The frame 15 carries a rotary earth working appliance (not shown). This appliance includes a longitudinally extending shaft on which is mounted a series of resilient tines. The shaft for the tines is power driven through the medium of a flexible shaft 17 from the power take-off 18 of the tractor. Attention is called to the fact that the flexible shaft includes two universal joints 19 and 20 and a sliding connection 21. This is important in view of the fact that this flexible shaft allows the raising and lowering of the machine M and the sidewise tilting thereof. By referring to Figure 2, it can be seen that this main drive shaft 17 is arranged directly at the longitudinal axis of the tractor.

Forming a part of the frame 15 of the earth working machine M is a pair of forwardly extending spaced parallel frame plates 22. These plates are welded or otherwise firmly and rigidly secured to an appropriate part of the frame 15. These spaced parallel frame plates 22 and the supporting plate 12 on the tractor with its circular bearing disk 13 forms a part of the coupling mechanism C that will now be described in detail.

The coupling mechanism C includes a pair of spaced parallel connecting side plates 23 and these plates are rockably mounted upon a transversely extending cross pivot shaft 24 carried by the lower ends of the spaced frame plates 22. These plates 23 project forwardly toward the tractor T and are resiliently connected at their upper ends to the side frame plates 22. This resilient connection includes slide bolts 25, the rear ends of which are provided with eyes 26. These eyes are rockably fastened to the frame plates 22 by means of headed machine bolts 27 which are threaded into bosses 28 formed on the upper forward corners of the frame plates 22. Thus the bolts 25 are free to rock on the machine bolts or screws 27. The bolts 25 extend forwardly toward the tractor and are slidably and loosely received in guide openings formed in laterally projecting brackets 29. Coiled on the slide bolts 25 are expansion springs 30 and the rear ends of these springs abut against the brackets 29. Threaded on the slide bolts 30 are stop nuts 31 which confine and hold the forward ends of the springs on the bolts. By this construction and arrangement it can be seen that the springs 30 resist the downward tilting of the earth working machine M on the pivot shaft 24. The connecting plates are held in their proper spaced relation by an upper brace cross rod 32 and this cross rod has its terminals rigidly secured to the connecting plates adjacent to the upper rear corners thereof. The forward ends of the connecting plates are detachably united to the tractor by novel coupling members 33.

The coupling members 33 are rigidly fastened in spaced parallel relation to a bearing supporting plate 34 and this plate is placed in abutting relation to the tractor supporting draft plate 12. As is clearly shown in Figure 7 the bearing plate 34 at its axial center is provided with a bearing opening 35 which rotatably receives the central bearing disk 13. In order to hold the bearing plate on the bearing disk a confining plate 36 is rigidly fastened by means of cap screws 37 to the bearing disk and this confining plate extends over the outer face of the bearing plate. By this construction and arrangement the bearing plate can turn relative to the tractor on the bearing disk.

Attention is now directed to the coupling members 33 and each of these coupling members consists of a bracket 38 having formed thereon a pair of spaced parallel ears 39. These ears are provided with bearing seats 40 and the ears are flared toward said bearing seats to provide a wide flaring guide throat entrance leading to said seats. Mounted between the ears 39 for swinging movement is a coupling hook 42. The hook is rockably mounted on its upper end between the ears 39 by means of a pivot pin 43. The opposite end of the hook terminates in an eye 44 and when the hook is swung down over the bearing seats 40 the same can be confined and placed against swinging movement by a lock pin or bolt 45 which passes through the ears 39 and through the eye 44. The upper end of the hook 42 terminates in a downwardly extending finger 46 and it is to be noted that this finger is normally arranged below the pivot pin 43.

The upper forward ends of the connecting plates 23 carry a transversely extending brace rod 47 which cooperates with the brace rod 32 to hold these connecting plates in rigid spaced relation. The connecting plates 23 have secured to their outer faces directly opposite the terminals of the brace rod 47 attaching plates 48 which carry laterally extending coupling pins 49. These pins 49 are adapted to be received in the bearing seats 40 when the tractor T and the rotary ground working machine M are placed in coupling relation and coupling pins 49 are guided into the bearing seats by the guide throats 41.

Figure 5:
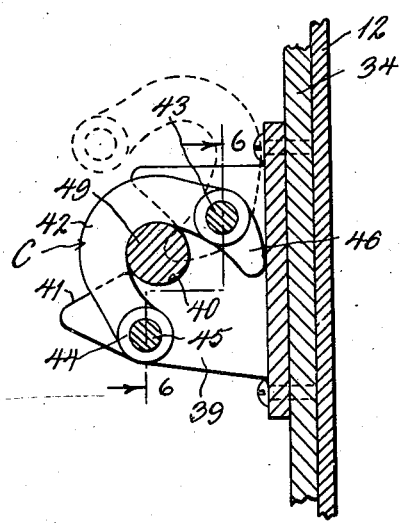
Figure 5 is a detailed sectional view taken on the line 5—5 of Figure 4 looking in the direction of the arrows illustrating one of the novel automatic coupling members, the view being taken on a larger scale than Figures 3 and 4.
Figure 6:
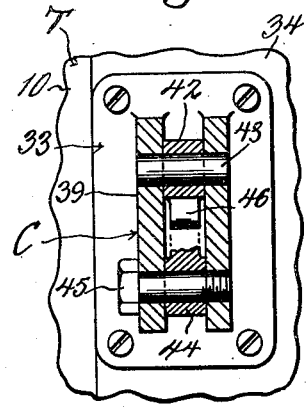
Figure 6 is a detailed sectional view through one of the novel automatic coupling members taken on the line 6—6 of Figure 5 looking in the direction of the arrows.

When the machine M is disconnected from the tractor, the coupling hooks 42 are in a raised elevated position, as shown in dotted lines in Figure 5 and when the coupling pins 49 are moved into the bearing seats these pins will strike the fingers 46 and automatically swing down the coupling hooks 42 over the coupling pins. The bolts 45 can now be placed in position for holding the hooks against swinging movement and in coupling relation with the pins.

The machine M can be raised and lowered on the coupling pins, and I prefer to provide a hydraulic lift mechanism 50 for this purpose.

Figure 3:
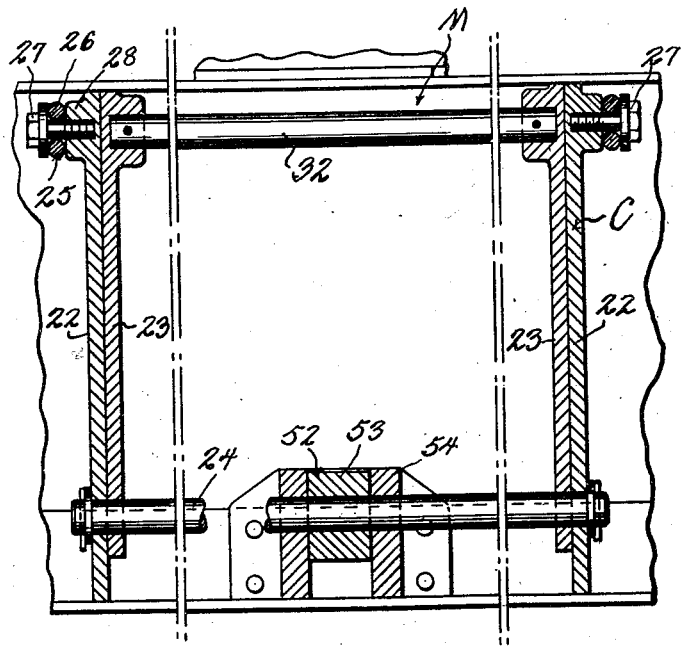
Figure 3 is an enlarged transverse sectional view taken on the line 3—3 of Figure 1 looking in the direction of the arrows illustrating a part of my novel coupling mechanism.
Figure 4:
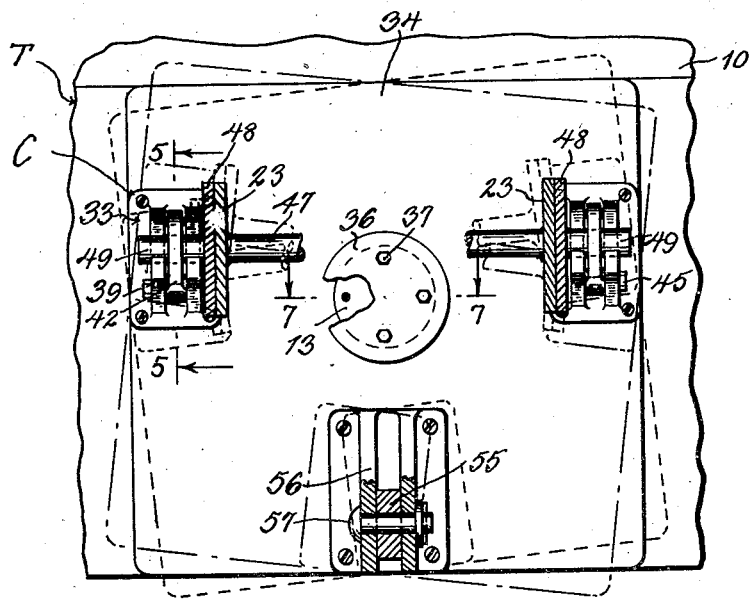
Figure 4 is a view similar to Figure 3 but taken on the line 4—4 of Figure 1 looking in the direction of the arrows.

The hydraulic lift mechanism can be of a character now found in the open market and as shown includes a cylinder 51. This cylinder has reciprocally mounted therein a piston (not shown) and its rod 52 extends outwardly of one end of the cylinder. The rear end of the piston rod 52 carries a knuckle 53 which is rotatably mounted upon the pivot shaft 24 utilized for uniting the connecting plates 23 with the frame attaching plates 22 of the machine M. In order to brace the pivot shaft and to prevent lateral shifting movement of the piston rod a bracket 54 can be secured to the frame of the machine M and the pivot shaft can extend through said bracket and the piston rod is received between the ears of the bracket, as is clearly shown in Figure 3 of the drawings.

The forward end of the cylinder 51 has formed thereon an ear 55 and this ear is received in a bearing bracket 56 which is rigidly bolted or otherwise fastened to the lower end of the bearing rock plate 34. A detachable pivot pin 57 is utilized for pivotally connecting the forward end of the cylinder 51 with said bracket 56. Attention is called to the fact that the cylinder 51 is located directly below the flexible or universal drive shaft 17. Upon the introducing of fluid under pressure into one end of the cylinder the piston can be forced rearwardly for swinging up the machine on the coupling pins. Upon the release of the pressure the machine M will swing down under its own weight or if desired fluid under pressure can be introduced into the end of the cylinder for forcibly moving the piston toward the front of the cylinder. The valve for controlling the flow of fluid under pressure to and from the cylinder can be arranged in convenient relation to the driver of the tractor T.

From the foregoing description it can be seen that I have provided an exceptionally simple and rugged coupling device for permitting the convenient and direct connection of a rotary earth working machine M with a tractor. The coupling is such that the machine M can rock up and down and tilt sideways to conform to the character of the ground or roadway over which the tractor is traveling. Obviously the hydraulic lift mechanism 50 can be employed for holding the machine M in raised position out of engagement with the ground.

Changes in details may be made without departing from the spirit or the scope of my invention, but what I claim as new is:

1. The combination with a tractor and a rotary earth working machine, of a coupling for directly connecting the machine with the tractor including a rotary bearing tractor carried draft plate, coupling brackets secured to the plate, and connecting draft plates carried by the machine having coupling pins for connection with said brackets.

2. The combination with a tractor and a rotary earth working machine, of a coupling mechanism for connecting the tractor and machine together including a rotary draft plate, means mounting said draft plate on the tractor for turning movement, rearwardly projecting coupling brackets secured to the plate on opposite sides of said connecting means, connecting draft plates hingedly carried by the machine and coupling pins on the said ends of said connecting draft plates detachably mounted in said brackets for rocking movement.

3. The combination with a tractor and a rotary earth working machine, of a coupling device for connecting the machine directly to said tractor including a rotary draft plate, means securing the draft plate to the tractor for turning movement, rearwardly projecting coupling brackets on said plate arranged on opposite sides of said means, spaced frame plates on the machine, connecting draft plates pivotally connected at their lower ends to said frame plates, means resiliently connecting the upper ends of the connecting draft plates to the frame plates, means hingedly connecting the forward ends of the connecting draft plates to the brackets, and a hydraulic lift mechanism operatively connecting the machine with the tractor below said brackets.

4. In a device for directly coupling a rotary earth working machine with a tractor, a pair of spaced vertical frame plates carried by the machine, a draft plate carried by the tractor for turning movement around its axial center, rearwardly projecting coupling brackets on the rotary draft plate arranged on opposite sides of the axial center thereof, connecting draft plates rockably mounted at their lower rear ends on the frame plates, swinging bolts carried by the upper ends of the frame plates, abutments on the connecting draft plates slidably receiving the bolts, adjusting nuts on the forward ends of said bolts, expansion springs coiled on said bolts and confined between the abutments and the nuts for normally holding the machine against swinging movement on the connecting draft plates, means detachably and pivotally connecting the forward ends of the draft plates to the brackets, and a hydraulic lift mechanism disposed below said brackets carried by the rotary draft plate and operatively connected to the machine being pulled.

5. In a device for directly coupling an implement with a tractor, a draft plate, a pair of rearwardly extending brackets having bearing seats, a coupling hook pivotally connected to each bracket adapted to swing over the bearing seats, a pair of connecting draft plates each having a coupling pin for attachment to an associated bearing seat and coupling hook, said coupling hooks having depending fingers disposed below the pivot points of the hooks and in the path of the pins when the pins are being introduced into said seats, whereby the hooks will be automatically moved over said pins.

MANDO S. ARIENS.